United States Patent
Laskowski et al.

(10) Patent No.: US 7,750,264 B2
(45) Date of Patent: Jul. 6, 2010

(54) HIGH VOLTAGE SWITCH CONFIGURATION

(75) Inventors: Karsten Laskowski, Berlin (DE); Manfred Meinherz, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 660 days.

(21) Appl. No.: 11/661,626

(22) PCT Filed: Aug. 1, 2005

(86) PCT No.: PCT/EP2005/053739
§ 371 (c)(1),
(2), (4) Date: Feb. 28, 2007

(87) PCT Pub. No.: WO2006/024586
PCT Pub. Date: Mar. 9, 2006

(65) Prior Publication Data
US 2008/0314724 A1 Dec. 25, 2008

(30) Foreign Application Priority Data
Aug. 30, 2004 (DE) .................. 10 2004 042 310

(51) Int. Cl.
*H01H 33/42* (2006.01)
(52) U.S. Cl. .................. 218/2; 218/153; 218/154; 200/48 R
(58) Field of Classification Search .............. 200/17 R, 200/18, 48 R, 48 P, 48 A, 48 V, 48 SB, 48 CB; 218/1–7, 152–155
See application file for complete search history.

(56) References Cited

U.S. PATENT DOCUMENTS

| 3,662,128 | A | * | 5/1972 | Neudorfer et al. | 200/48 R |
| 3,889,076 | A | * | 6/1975 | Olsen et al. | 200/48 R |
| 4,331,847 | A | * | 5/1982 | Cretin | 200/48 R |
| 4,467,157 | A | | 8/1984 | Nicoloso et al. | |

(Continued)

FOREIGN PATENT DOCUMENTS

| DE | 876 859 | 5/1953 |
| DE | 28 25 744 | 4/1979 |
| DE | 32 37 238 C2 | 5/1983 |
| DE | 40 11 443 C2 | 10/1991 |

(Continued)

*Primary Examiner*—Michael A Friedhofer
(74) *Attorney, Agent, or Firm*—Laurence A. Greenberg; Werner H. Stemer; Ralph E. Locher

(57) ABSTRACT

A high-voltage switch configuration having a subdivision housing, which is supported on a frame by an insulating supporting housing, and having a switch which is fitted to this subdivision housing and has an insulator, a switching chamber surrounded by the insulator, and disconnectible contacts which are accommodated in the switching chamber. The switch can be switched via a switching linkage that can be operated by a drive and is arranged within the supporting housing and the subdivision housing. At least three switches are attached to the subdivision housing, and each switch has a separate associated switching linkage with a separate drive.

11 Claims, 3 Drawing Sheets

U.S. PATENT DOCUMENTS

| | | | |
|---|---|---|---|
| 4,510,359 A * | 4/1985 | de Calvino y Teijeiro | 218/143 |
| 4,541,033 A | 9/1985 | Saito | |
| 5,128,502 A * | 7/1992 | Hux | 218/153 |
| 6,198,062 B1 * | 3/2001 | Mather et al. | 218/152 |
| 6,313,424 B1 * | 11/2001 | Bachofen | 218/6 |
| 6,649,853 B2 * | 11/2003 | Takagi et al. | 218/7 |
| 6,943,307 B2 * | 9/2005 | Hunger et al. | 200/48 R |
| 7,053,326 B2 * | 5/2006 | Muraki et al. | 218/2 |

FOREIGN PATENT DOCUMENTS

| | | |
|---|---|---|
| DE | 195 12 222 A1 | 9/1996 |
| EP | 1 207 601 A2 | 5/2002 |
| JP | 2002237237 A | 8/2002 |
| JP | 2003-259514 | 9/2003 |
| JP | 2004120953 A | 4/2004 |

* cited by examiner

HIGH VOLTAGE SWITCH CONFIGURATION

BACKGROUND OF THE INVENTION

Field of the Invention

The invention relates to a high-voltage switch configuration having a subdivision housing, which is supported on a frame by an insulating supporting housing, and having a switch which is fitted to this subdivision housing and has an insulator, a switching chamber surrounded by the insulator, and disconnectible contacts which are accommodated in the switching chamber. The switch can be switched via a switching linkage that can be operated by a drive and is arranged within the supporting housing and the subdivision housing.

DE 28 25 744 A1 discloses a compressed-gas high-voltage switch for outdoor installation, in which a tubular supporting insulator is supported on a grounded supporting housing, and in which a subdivision housing is fitted to the upper end of the supporting insulator. Two tubular insulators are connected to the subdivision housing, with switching units being arranged in each of them. The switching units are connected via levers mounted by joints to a tubular switching element, which is passed through the supporting insulator and can be operated via a mechanical drive unit. The tubular switching element operates both switching units via the articulated lever.

A similar assembly is described in EP 1207601 A2.

SUMMARY OF THE INVENTION

The invention is based on the object of providing a high-voltage switch configuration which has a plurality of switches, with one aim being to allow variable operation of the individual switches, and with a further aim being to ensure reliable use even in three-phase systems.

According to the invention, this object is achieved by the characterizing features of the main claim in conjunction with the features of the preamble.

Since at least three switches are attached to the subdivision housing and each switch has a separate associated switching linkage with a drive, the high-voltage switch configuration can be used variably. If one of the switches, for example a switch disconnector in the high-voltage switch configuration, fails, the others can still operate, independently of it.

The measures specified in the dependent claims allow advantageous developments and improvements.

It is particularly advantageous for three units, each comprising an insulating supporting housing, a subdivision housing and at least three switches with a respective associated switching linkage to be arranged jointly on a mounting rack, with the switching linkage of the individual units being connected via a coupling linkage to a respective drive. In consequence, the respectively associated switches in the units can be operated independently of the other switches and, if one drive fails, the other drives can continue to operate the associated switches in the various units.

The switches are preferably in the form of switch disconnectors, circuit breakers and/or combined circuit breakers with an isolating path function.

Exemplary embodiments of the invention will be explained in more detail in the following description, and are illustrated in the drawing, in which:

DESCRIPTION OF THE PREFERRED EMBODIMENTS

Figure 1:
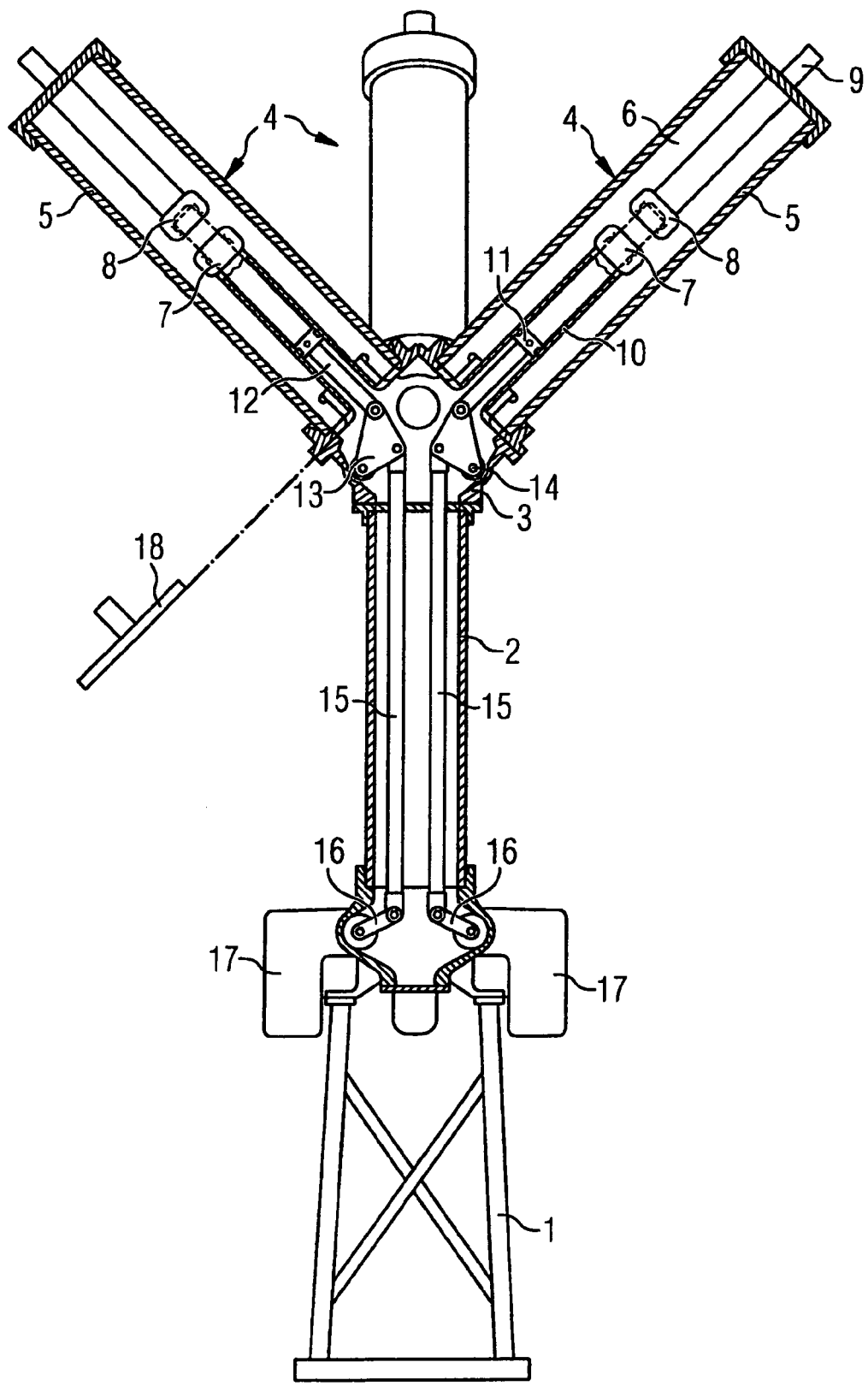
FIG. 1 shows a first exemplary embodiment of a high-voltage switch configuration according to the invention, partially sectioned.

The high-voltage arrangement illustrated in FIG. 1 is suitable for use for example in H circuits, 1½, 1 and ½ circuit-breaker arrangements, ring busbar arrangements and double busbar arrangements. It has a tubular, insulating supporting housing 2 arranged on a frame 1, a subdivision housing 3 which is at high-voltage potential, and switch disconnectors 4 which are fitted to the subdivision housing, in the present case three switch disconnectors, which each have a switching chamber 6 surrounded by an insulator 5.

Contact elements 7, 8 which can be disconnected are located in the switching chamber 6 of each switch disconnector 4 and in the present case are in the form on the one hand of a switching pin 7 and on the other hand of a moving contact 8, with the moving contact 8 in each case being connected to external connections 9. The switching pin 7 of each of the switch disconnectors 4 is guided in a tube 10 by means of a guide 11, and is connected to a rod 12. The rod 12 is articulated in a hinged manner on a double lever 13, which is mounted such as it can rotate at a rotation point 14, which comprises a rotating shaft with a rotating position. A switching rod 15 is articulated on each double lever (each switch disconnector 4 has an associated double lever 13), is passed through the supporting housing 2 and is connected at its lower end via a deflection element 16 (which may comprise a jointed lever and a shaft with a rotating bearing) to a drive 17 for the associated switch disconnector 4. The drive 17 is preferably in the form of a motor drive.

A separate drive 17, a separate deflection element 16, a separate switching rod 15, a separate double lever and a separate rod 12 are provided for each switch disconnector 4. When the drive 17 is operated by an external control, the switching rod 15 is moved downwards in the vertical direction via the deflection element 16, which results in the double lever 13 being pulled downwards, the rod 12 together with the guide 11 and the switching pin 7 being moved in the tube 10, and the switching pin 7 being released from the moving contact 8. Each switch disconnector 4 can thus be operated individually, that is to say each switch has its own switching path and its own switching linkage.

In FIG. 1, the switch disconnectors 4 are arranged on the circumference of the subdivision housing 3, in which case just one power connection can also be provided, for example on a cover, instead of a switch disconnector 4. This is indicated by the cover 18 in FIG. 1.

Figure 2:
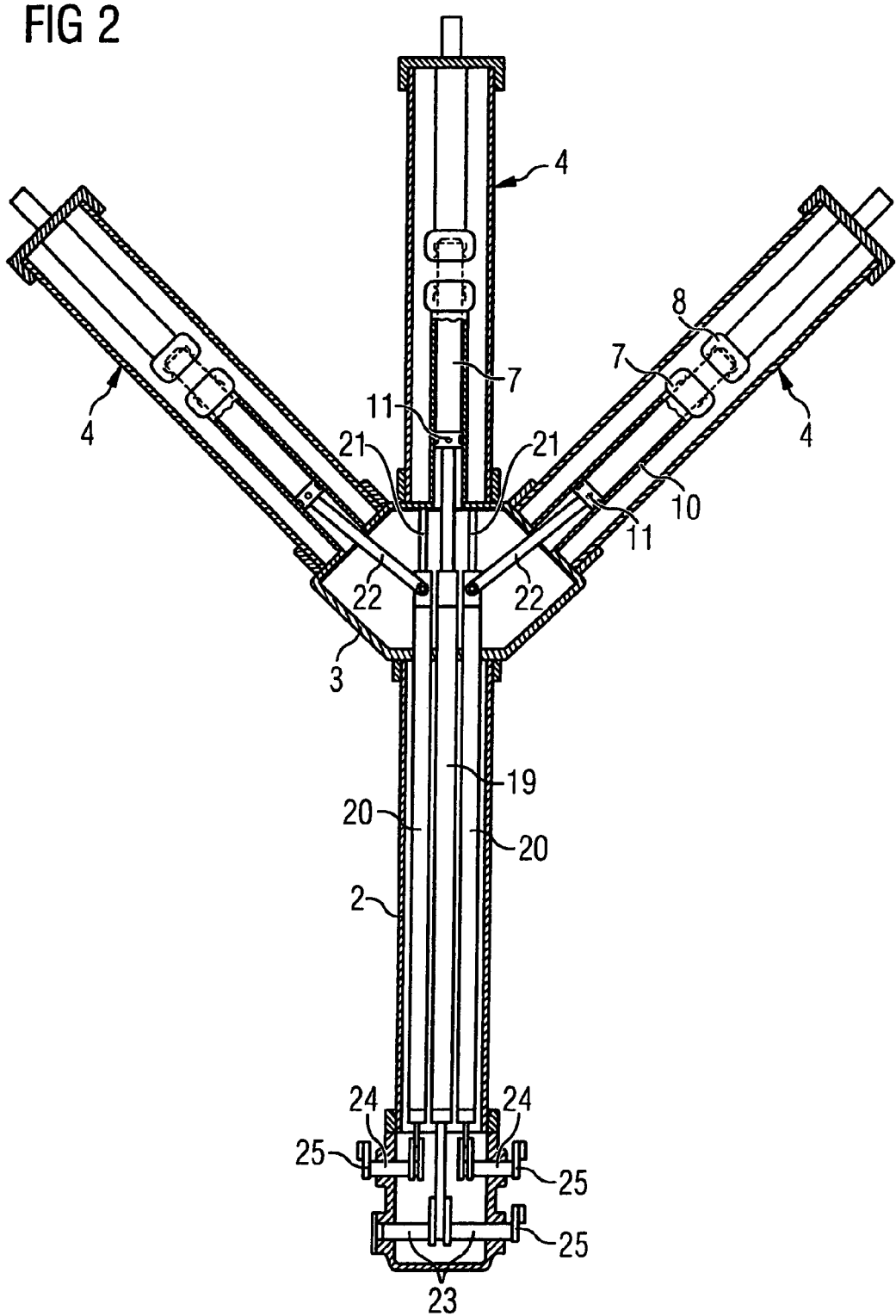
FIG. 2 shows a section through a further exemplary embodiment of a high-voltage switch configuration according to the invention, in which the holding rack has been omitted.

FIG. 2 shows a further exemplary embodiment, in which the switch disconnectors 4 are arranged on a plane. The arrangement shown in FIG. 2 differs from that shown in FIG. 1 mainly in the switching linkage. In this case, the switching rod 19 for the central switch disconnector 4 is different to the switching rod 20 of the outer switch disconnectors 4, to be precise in such a way that the central switching rod 19 is coupled directly to the switching pin 7 and to the guide 11, while the outer switching rods 20, which are arranged such that they can be moved at right angles on respective switching rod guides 21, are connected via a coupling rod 22 to the switching pin 7, with each of the coupling rods 22 being mounted in a hinged manner on the switching rod 20 and the guide 11.

Operating shafts 23 and 24 and couplings 25 to the drives, which are not illustrated, can be seen in the lower part of the arrangement shown in FIG. 2. The method of operation corresponds to that shown in FIG. 1.

Figure 3:
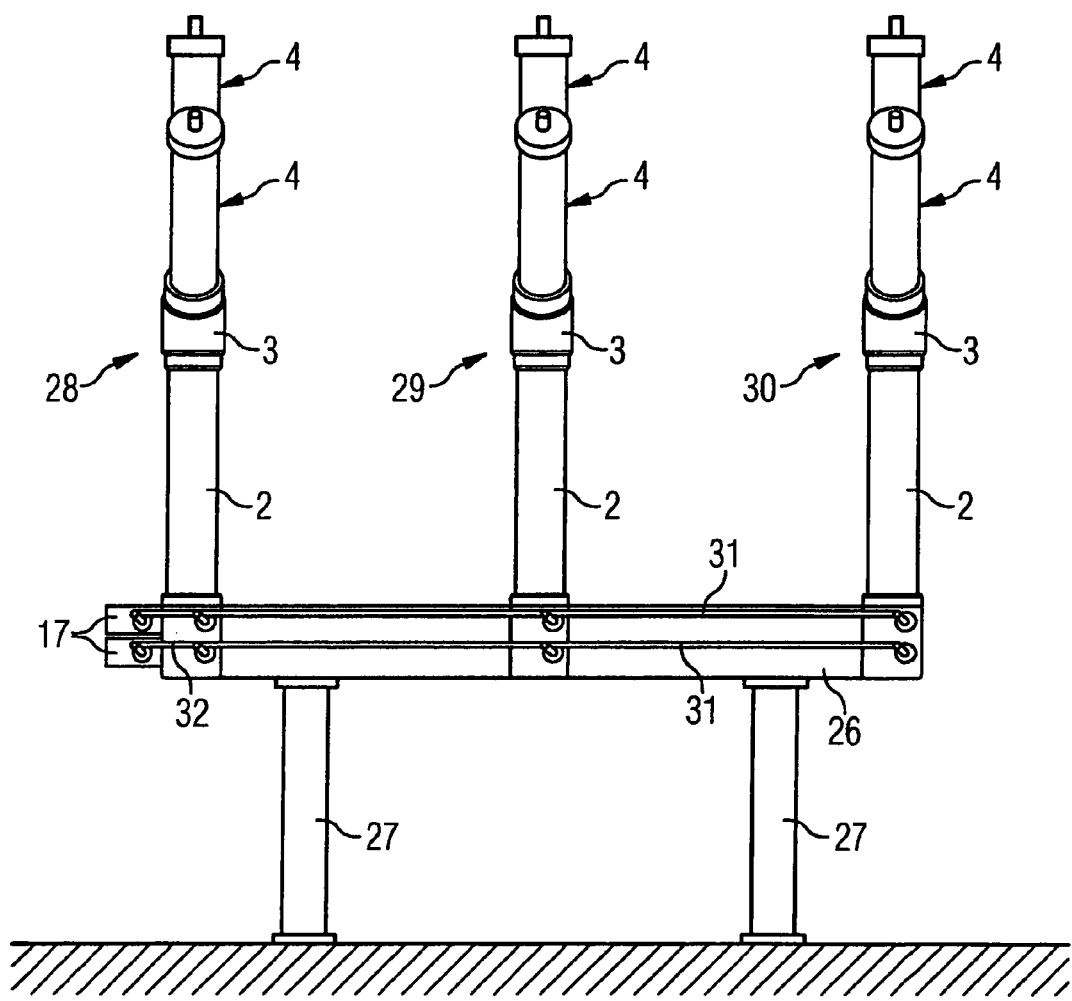
FIG. 3 shows a further exemplary embodiment of the high-voltage switch configuration according to the invention, which is suitable for a three-phase system.

FIG. 3 shows a high-voltage switch configuration which is suitable for a three-phase system. In this arrangement, three units as shown in FIG. 2 are mounted on a common connection frame 26 with appropriate supports 27. The three units 28, 29, 30 form the various poles, in which case it should be noted that, it is, of course, also possible to use one unit as shown in FIG. 1. In this embodiment, the three drives 17, of which only two can be seen here, are arranged close to the unit 28 and operate the associated switch disconnectors 4 via the switching linkage, as described above. The three units 28, 29, 30 are connected to one another via three coupling linkages 31, 32, of which only two can be seen, to be more precise, the respective coupling linkage 32 connects the respective drive 17 to the switching rods of the unit 28, and the coupling linkage 31 connects the drives 17 via the coupling linkage 32 to the switching rods of the respective units 29, 30.

When it is intended to operate one of the switch disconnectors 4 in the units 28, 29, 30, the associated drive 17 is operated, and the respectively associated switch disconnectors 4 in the units 29 and 30 are operated via the coupling linkage 31, 32 by a motor.

The above exemplary embodiment has been described with switch disconnectors as the switches. It is, of course, also possible to use circuit breakers, combined circuit breakers with an isolating gap function, or a combination.

LIST OF REFERENCE SYMBOLS

1 Frame
2 Supporting housing
3 Subdivision housing
4 Switch disconnector
5 Insulator
6 Switching chamber
7 Contact elements—switching pin
8 Contact elements—moving contact
9 External connections
10 Tube
11 Guide
12 Rod
13 Double lever
14 Rotation point
15 Switching rod
16 Deflection element
17 Drive
18 Cover
19 Switching rod
20 Switching rod
21 Switching rod guide
22 Coupling rod
23 Operating shaft
24 Operating shaft
25 Couplings
26 Connection frame
27 Supports
28, 29, 30 Units
31, 32 Coupling linkage

We claim:

1. A high-voltage switch configuration, comprising:
an insulating supporting housing supported on a frame;
a subdivision housing supported on said insulating supporting housing;
at least three switches mounted to said subdivision housing, each of said switches having an insulator, a switching chamber surrounded by said insulator, and disconnectible contacts accommodated in said switching chamber;
switching linkages disposed in said supporting housing and said subdivision housing and connected to operate each of said switches; and
separate drives connected to said switching linkages for operating each of said switches through a respectively associated said switching linkage;
wherein each one of said separate drives operates a respective one of said switches independently of a switching state of all others of said switches.

2. The high-voltage switch configuration according to claim 1, which comprises:
three units each having a supporting housing, a subdivision housing with a plurality of said switches attached thereto, and associated switching linkages mounted to said frame for three phases of a three-phase system;
a number of drives, equal to a number of switches of a respective said unit; and
coupling elements connecting individual said units to one another and said coupling elements connecting said switching linkages of said switches of said individual units to a respective said drive.

3. The high-voltage switch configuration according to claim 1, wherein each switching linkage includes:
at least one switching rod extending through said supporting housing;
at least one coupling rod connected to said switching rod via a joint and connected to a moving contact of the respective said switch; and
at least one coupling connection for coupling said at least one switching rod to said drive or to a coupling element for said drive.

4. The high-voltage switch configuration according to claim 3, wherein said joint is a double lever, mounted on a pivot shaft with a pivot bearing, and having said switching linkage and said coupling rod articulated thereon.

5. The high-voltage switch configuration according to claim 1, wherein at least one switching rod is coupled directly to a moving contact of said disconnectible contacts.

6. The high-voltage switch configuration according to claim 1, wherein said switches are disconnector switches and/or circuit breakers.

7. A high-voltage switch configuration, comprising:
an insulating supporting housing supported on a frame;
a subdivision housing supported on said insulating supporting housing;
at least three switches mounted to said subdivision housing, each of said switches having an insulator, a switching chamber surrounded by said insulator, and disconnectible contacts accommodated in said switching chamber;
switching linkages disposed in said supporting housing and said subdivision housing and connected to operate each of said switches;
separate drives connected to said switching linkages for operating each of said switches through a respectively associated said switching linkage;

three units each having a supporting housing, a subdivision housing with a plurality of said switches attached thereto, and associated switching linkages mounted to said frame for three phases of a three-phase system;

a number of drives, equal to a number of switches of a respective said unit; and coupling elements connecting individual said units to one another and said coupling elements connecting said switching linkages of said switches of said individual units to a respective said drive.

8. The high-voltage switch configuration according to claim 7, wherein each switching linkage includes:

at least one switching rod extending through said supporting housing;

at least one coupling rod connected to said switching rod via a joint and connected to a moving contact of the respective said switch; and at least one coupling connection for coupling said at least one switching rod to said drive or to a coupling element for said drive.

9. The high-voltage switch configuration according to claim 8, wherein said joint is a double lever, mounted on a pivot shaft with a pivot bearing, and having said switching linkage and said coupling rod articulated thereon.

10. The high-voltage switch configuration according to claim 7, wherein at least one switching rod is coupled directly to a moving contact of said disconnectible contacts.

11. The high-voltage switch configuration according to claim 7, wherein said switches are disconnector switches and/or circuit breakers.

* * * * *